US009693509B2

(12) United States Patent
Biel Borraz et al.

(10) Patent No.: US 9,693,509 B2
(45) Date of Patent: Jul. 4, 2017

(54) BIODEGRADABLE MULCH FOR AGRICULTURAL APPLICATIONS
(71) Applicant: SPHERE GROUP SPAIN, S.L., Zaragoza (ES)
(72) Inventors: Alfonso Biel Borraz, Zaragoza (ES); Carlos Zaragoza Larios, Zaragoza (ES); Alicia Cirujeda Ranzenberger, Zaragoza (ES); Joaquin Aibar Lete, Zaragoza (ES); Ana Isabel Marí León, Zaragoza (ES); Inmaculada Lahoz García, Zaragoza (ES); Juan Ignacio Macua Gonzalez, Zaragoza (ES); Maria Luisa Suso Martínez de Bujo, Zaragoza (ES); Nuria Vázquez García, Zaragoza (ES); Marta María Moreno Valencia, Zaragoza (ES); Carmen Moreno Valencia, Zaragoza (ES); Ramón Meco Murillo, Zaragoza (ES); Lluis Martín Closas, Zaragoza (ES); Ana María Pelacho Aja, Zaragoza (ES); Joan Costa Tura, Zaragoza (ES)
(73) Assignee: SPHERE GROUP SPAIN, S.L., Zaragoza (ES)
( * ) Notice: Subject to any disclaimer, the term of this patent is extended or adjusted under 35 U.S.C. 154(b) by 193 days.
(21) Appl. No.: 14/768,400
(22) PCT Filed: Feb. 14, 2014
(86) PCT No.: PCT/ES2014/070115
§ 371 (c)(1),
(2) Date: Aug. 17, 2015
(87) PCT Pub. No.: WO2014/125157
PCT Pub. Date: Aug. 21, 2014

(65) Prior Publication Data
US 2016/0000022 A1 Jan. 7, 2016

(30) Foreign Application Priority Data
Feb. 18, 2013 (ES) .................................. 201330214

(51) Int. Cl.
*A01K 13/00* (2006.01)
*A01G 13/02* (2006.01)
(52) U.S. Cl.
CPC ..... *A01G 13/0262* (2013.01); *A01G 13/0275* (2013.01)
(58) Field of Classification Search
CPC ............ A01G 13/0262; A01G 13/0275; A01G 13/0268; C09K 17/52
USPC ............................................................... 47/9
See application file for complete search history.

(56) References Cited

U.S. PATENT DOCUMENTS

| | | | | |
|---|---|---|---|---|
| 3,867,324 A * | 2/1975 | Clendinning | .......... | A01C 1/046 260/DIG. 43 |
| 3,901,838 A * | 8/1975 | Clendinning | ........ | C08K 3/0075 260/DIG. 43 |
| 3,931,068 A * | 1/1976 | Clendinning | ...... | A01G 13/0275 220/DIG. 3 |
| 3,932,319 A * | 1/1976 | Clendinning | ........ | B65D 65/466 220/DIG. 30 |
| 3,949,145 A | 4/1976 | Otey et al. | | |
| 4,827,665 A * | 5/1989 | Hubbs, Jr. | .............. | C09K 17/32 47/58.1 R |
| 5,125,770 A * | 6/1992 | Hesseling | ................. | C08L 3/02 106/900 |
| 5,683,957 A * | 11/1997 | Huang | ................... | A01C 1/044 47/DIG. 10 |
| 5,879,695 A * | 3/1999 | Bastiaansen | ........... | C09K 17/52 424/405 |
| 6,018,004 A * | 1/2000 | Warzelhan | ......... | C08G 18/4216 525/437 |
| 6,301,829 B1 * | 10/2001 | Kaufmann | ......... | A01G 13/0262 111/102 |
| 7,059,083 B2 * | 6/2006 | Abitz | ..................... | A01G 1/005 47/56 |
| 2004/0082678 A1 * | 4/2004 | Xu | ........................... | C08L 3/00 522/1 |
| 2004/0208709 A1 * | 10/2004 | Marsden | ................ | C09K 17/32 405/264 |
| 2005/0279019 A1 * | 12/2005 | Slanghek | ............... | C09K 17/52 47/9 |
| 2006/0047068 A1 * | 3/2006 | Doane | .................... | A01G 13/02 525/54.3 |
| 2010/0180493 A1 * | 7/2010 | Kim | ................... | A01G 13/0268 47/9 |
| 2011/0113983 A1 * | 5/2011 | Bernu | .................... | C09K 17/50 106/15.05 |
| 2012/0135169 A1 | 5/2012 | Tangelder et al. | | |
| 2013/0145687 A1 * | 6/2013 | Cristobal | ............... | C09K 17/52 47/58.1 SC |

FOREIGN PATENT DOCUMENTS

GB 2247431 A 3/1993
WO 2011054892 A1 5/2011

OTHER PUBLICATIONS

Briassoulis et al. Mechanical behaviour 1-5 of biodegradable agricultural films under real field conditions, Polymer Degradation and Stability, Jan. 6, 2006 vol. 91 No. 6 pp. 1256-1272.
International Search Report for PCT/ES2014/070115 filed Aug. 21, 2014.
International Preliminary Report on Patentability for PCT/ES2014/070115 filed Aug. 21, 2014.
Written Opinion of the ISR for for PCT/ES2014/070115 filed Aug. 21, 2014.

* cited by examiner

*Primary Examiner* — Monica Williams
(74) *Attorney, Agent, or Firm* — Notaro, Michalos & Zaccaria P.C.

(57) ABSTRACT

Biodegradable mulch of the type used in various agricultural applications is made by multi-layer extrusion from a mixture of two compostable biodegradable polymers that comply with the EN13432 standard and that include potato starch, a black masterbatch and biodegradable recycled polymers. The mulch self-degrades in a short period of time, becoming a compostable material that enriches the soil, avoiding the collecting and cleaning tasks that are necessary in conventional mulches.

6 Claims, No Drawings

BIODEGRADABLE MULCH FOR AGRICULTURAL APPLICATIONS

This description relates, as its title indicates, to a biodegradable mulch of the type used in various agricultural applications, characterised in that it is made by multi-layer extrusion from a mixture of two compostable biodegradable polymers that comply with the EN13432 standard and that include potato starch, a black masterbatch and biodegradable recycled polymers.

FIELD OF THE INVENTION

The invention relates to the field of plastic films or mulches used in agricultural applications

THE PRIOR ART

Currently plastic films or mulches are widely known and used in different agricultural tasks, the main one of these being mulching. Mulching is a technique that is used to protect crops and soil from the action of atmospheric agents, which in addition to other effects, reduce the quality of fruit, dry out soil, cool the ground and carry away or wash away fertilizers, increasing costs. This cultivation technique has considerably increased the economic performance of plantations and is applicable to a wide variety of crops.

Mulching is commonly used for crops in which seedlings are planted and the main aim pursued is to protect the crop from the proliferation of weeds and avoid their growth hindering plant development. Furthermore, the mulching technique seeks to protect crops and soil from the damaging effects of atmospheric agents and thus provides the following benefits for crops:

It prevents weeds from growing as it stops photosynthetically active light radiation from penetrating under the plastic. This favours a more organic crop because the use of herbicides is reduced.

It optimises water resources since it reduces water evaporation from the soil and hence the drying out of the soil.

It optimises the action of fertilizers by preventing them from being washed away by rainwater or evaporated due to the action of the sun.

It improves the appearance and quality of fruit because it prevents them from coming into direct contact with the soil It provides greater harvest precocity than would be the case without plastic.

Agricultural plastic waste causes environmental problems if it is incinerated in an uncontrolled way or is not treated or stored appropriately. Among these problems, the main ones are contamination of soil and surface water as well as negative impacts on the landscape.

Plastics used in mulching on agricultural land are essentially low density polyethylene polymers (LDPE) which, in principle, means that they are recyclable but have the drawback of requiring the task of collecting them, cleaning off remains of soil and transporting them for recycling.

Although the chemical composition of this plastic waste is not a drawback for recycling it, the state in which it arrives at the collection points is. The great amount of soil that these plastics incorporate during their use makes it really difficult to subsequently recycle them.

An example of this type of biodegradable mulch is described, for example, in Utility Model U200801310 "Film for crops".

Some attempts to use biodegradable materials are known. For example, Spanish patents P200501122 "Sack for agricultural use" and P200501019 "Sheet for agricultural use" use biodegradable cellulose paper that is of a lower strength and is more difficult to manufacture.

In addition, there are certain applications of biodegradable polymers derived from potato, such as, for example, those described in Spanish Utility Models U201000437 "Multipurpose biodegradable and compostable bag", U201000247 "Compostable rain cape" and in Spanish patent E03250183 "Biodegradable containers that can become compost", but they are not specifically oriented towards films or mulches for agricultural use, which have much higher demands in terms of mechanical strength requirements.

DESCRIPTION OF THE INVENTION

To solve the problems that exist at present with the use of mulches and films for agricultural use, the biodegradable mulch for agricultural applications that is the object of this invention has been devised, being made by multi-layer co-extrusion from a mixture of two compostable biodegradable polymers that comply with the EN13432 standard and that include potato starch, black masterbatch and biodegradable recycled polymers.

These polymers are made from potato starch, a tuber that affords numerous advantages, such as its yield per hectare and its starch level. They can be handled like traditional plastic materials, colouring them, black in this case, using colouring agents that are also compostable and biodegradable.

The material used for the agricultural mulches is a film produced in an extruder, preferably three-layer, with a thickness of 15 microns (+/−8%).

Polymer extrusion is a mechanical industrial process in which there is a pressing action, moulding the plastic that, by continuous flow with pressure and pushing, forces it through a mould that gives it the desired shape. The molten polymer is forced to pass through a sizing die, also known as a nozzle, by the thrust generated by the rotating action of a spindle that rotates concentrically in a chamber called a barrel at controlled temperatures, with a millimetric separation between both elements. The polymer material is fed via a hopper at one end of the machine and, by the pushing action, it melts flows and mixes in the barrel and, at the other end, a predetermined geometrical profile is obtained.

The polymer melts due to the mechanical action combined with the increase in its temperature from barrel heating. The mechanical action includes cutting and dragging forces that push the polymer towards the nozzle and involve an increase in pressure.

The first melt that occurs in the system takes place on the inner wall of the barrel in the form of a thin film resulting from the increase in the temperature of the material and subsequently also due to friction. When this film grows it becomes detached from the barrel wall due to the rotation of the spindle in a to-and-fro movement and then a sweep, forming a pattern similar to a vortex or a rotary pattern with a final sweep. This continues until all the polymer melts.

The extruder is fed with the previously mentioned composition (mix of biodegradable materials and black colouring agent), which, when it melts produces a homogeneous mixture of the materials, providing the technical properties of the material that are required for it to be applied in the field.

There are different techniques for extruding polymers and that used preferably for producing the agricultural film is co-extrusion. A co-extruder is three extruding machines that converge into one single extrusion head. The film produced by this technique is preferably formed by three layers that join to form one single layer.

This manufacturing technique offers a very wide range of possibilities:

The thicknesses of each layer can be varied so that the sum of the three is the total thickness of the film.

Different materials and mixtures of materials can be introduced in each of the layers to obtain the desired end properties, it also being possible to include recycled materials and to reduce the film thickness while maintaining the desired properties.

The mulch is intended for agricultural uses, among which we can mention the following: covering of crops to protect them, protection of fruit, marking forest boundaries, hunting areas, etc.

After use, the mulch decomposes due to the effect of the microorganisms in the soil and it is eliminated naturally, without human intervention. Depending on its thickness, it will degrade within a period of between three months and one year to generate water, carbon dioxide and biomass, in accordance with the EN13432 standard. In this way, mulches become compost which acts as a fertilizer for agriculture.

Advantages of the Invention

The biodegradable mulch for agricultural applications that is presented affords multiple advantages over the films currently available, the most important one being that the mulch self-degrades in a short time of between 3 months and one year, becoming a compostable material that enriches and fertilizes the soil.

Another important advantage is that collecting and cleaning tasks necessary with conventional mulches are avoided, with the consequent savings on cost and labour.

Another advantage of this invention is that there is no risk of contaminating the agricultural environment, which has an impact on the better quality and greater durability of crops.

Another of the most important advantages to be highlighted is that the special composition of the film achieves mechanical properties that are similar or even better than those of conventionally used mulches, without any of their drawbacks.

It is also worth mentioning that the compost produced is compatible for use in organic agriculture.

PREFERRED EMBODIMENT OF THE INVENTION

The biodegradable mulch for agricultural applications that is the object of the present invention basically comprises compostable biodegradable biopolymers A and B which comply with the EN13432 standard and that include potato starch, black masterbatch and biodegradable recycled polymers. The proportion of each of the elements is:

biopolymer A—between 50 and 70% by weight,
biopolymer B—between 10 and 40% by weight,
black masterbatch—between 5 and 10% by weight, and
biodegradable recycled polymers—between 0 and 30% by weight All of the proportions refer to the end product.

Biopolymer A has a particle size of between 1.5 and 2.4 mm, a molten density of between 1.1 and 1.2 g/cm$^3$, a density of between 1.2 y 1.3 g/cm$^3$, a bulk density of between 740 and 800 kg/m$^3$, and a melt flow index MFI of between 2.5 and 5.5 g/10 min, at a temperature of 190° C. and with a weight of 5 kg on the piston.

Biopolymer B has a particle size of between 2 and 3 mm, a molten density of between 1.1 and 1.3 g/cm$^3$, a density of between 1.2 y 1.4 g/cm$^3$, a bulk density of between 880 and 940 kg/m$^3$, and a melt flow index MFI of between 20 and 40 g/10 min, at a temperature of 190° C. and with a weight of 2.16 kg on the piston.

The biodegradable mulch for agricultural applications is manufactured by co-extrusion with a multi-layer, preferably, three-layer structure. Its total thickness is 15 microns (+/− 8%).

Experimental tests performed have yielded the following mechanical characteristics for the mulch obtained, as can be seen in the table below:

| | | | | |
|---|---|---|---|---|
| Impact (g) Dart test/Dart test | | 180 | | |
| Opacity (%) | | 95% +/− 8% | | |
| | Mean | σ | max | min |
| Tear factor dm (mN) | | | | |
| Machine direction | 75.4 | 7.7 | 84.6 | 66.3 |
| Tear factor dt (mN) | | | | |
| Cross direction | 277 | 20.5 | 287.2 | 246.2 |
| | Mean (μ) | | σ | |
| Traction (N) | | | | |
| Machine direction | 9.64 | | 0.36 | |
| Cross direction | 5.81 | | 0.34 | |
| Elongation (%) | | | | |
| Machine direction | 148.46 | | 5.61 | |
| Cross direction | 234.68 | | 18.20 | |
| Perforation (N) | 10.64 | | 1.28 | |

The invention claimed is:

1. Biodegradable mulch for agricultural applications comprising:

compostable biodegradable biopolymer A that complies with the EN13432 standard, that incorporates potato starch in a proportion of between 50 and 70% by weight of the end product and that has a particle size of between 1.5 and 2.4 mm, a molten density of between 1.1 and 1.2 g/cm3, a density of between 1.2 and 1.3 g/cm3, a bulk density of between 740 and 800 kg/m3, and a melt flow index MFI of between 2.5 and 5.5 g/10 min, at a temperature of 190° C. and with a weight of 5 kg on a piston, compostable biodegradable biopolymer B that complies with the EN13432 standard and that includes potato starch in a proportion of between 10 and 40% by weight of the end product, black masterbatch in a proportion of between 5 and 10% by weight of the end product, and biodegradable recycled polymers in a proportion of up to 30% by weight of the end product.

2. Biodegradable mulch for agricultural applications according to claim 1, wherein biopolymer B has a particle size of between 2 and 3 mm, a molten density of between 1.1 and 1.3 g/cm3, a density of between 1.2 and 1.4 g/cm3, a bulk density of between 880 and 940 kg/m3, and a melt flow index MFI of between 20 and 40 g/10 min, at a temperature of 190° C. and with a weight of 2.16 kg on a piston.

3. Biodegradable mulch for agricultural applications according to claim 1, wherein the mulch comprises a co-extrusioned multi-layer structure.

4. Biodegradable mulch for agricultural applications according to claim 3, wherein the multi-layer structure is a three-layer structure.

5. Biodegradable mulch for agricultural applications according to claim 1, wherein the total thickness of the mulch is 15 microns (+/−8%).

6. Biodegradable mulch for agricultural applications comprising:
    compostable biodegradable biopolymer A that complies with the EN13432 standard, that incorporates potato starch in a proportion of between 50 and 70% by weight of the end product and that has a particle size of between 1.5 and 2.4 mm, a molten density of between 1.1 and 1.2 g/cm3, a density of between 1.2 and 1.3 g/cm3, a bulk density of between 740 and 800 kg/m3, and a melt flow index MFI of between 2.5 and 5.5 g/10 min, at a temperature of 190° C. and with a weight of 5 kg on a piston,
    compostable biodegradable biopolymer B that complies with the EN13432 standard and that includes potato starch in a proportion of between 10 and 40% by weight of the end product,
    black masterbatch in a proportion of between 5 and 10% by weight of the end product.

\* \* \* \* \*